United States Patent
Inoguchi et al.

(10) Patent No.: US 8,879,157 B2
(45) Date of Patent: Nov. 4, 2014

(54) OBSERVATION OPTICAL SYSTEM AND IMAGE DISPLAY APPARATUS

(75) Inventors: Kazutaka Inoguchi, Tokyo (JP);
Masakazu Tohara, Komae (JP)

(73) Assignee: Canon Kabushiki Kaisha (JP)

( * ) Notice: Subject to any disclaimer, the term of this patent is extended or adjusted under 35 U.S.C. 154(b) by 58 days.

(21) Appl. No.: 13/597,449

(22) Filed: Aug. 29, 2012

(65) Prior Publication Data

US 2013/0050835 A1  Feb. 28, 2013

(30) Foreign Application Priority Data

Aug. 30, 2011  (JP) ................................. 2011-186788

(51) Int. Cl.
| | | |
|---|---|---|
| *G02B 27/14* | (2006.01) | |
| *G02B 17/08* | (2006.01) | |
| *G02B 13/06* | (2006.01) | |
| *G02B 27/10* | (2006.01) | |
| *G02B 17/00* | (2006.01) | |
| *G02B 27/01* | (2006.01) | |

(52) U.S. Cl.
CPC .............. *G02B 13/06* (2013.01); *G02B 17/086* (2013.01); *G02B 2027/0123* (2013.01); *G02B 27/1066* (2013.01); *G02B 17/0856* (2013.01); *G02B 27/0172* (2013.01); *G02B 17/004* (2013.01)
USPC ......................................................... 359/630

(58) Field of Classification Search
USPC ......................................................... 359/630
See application file for complete search history.

(56) References Cited

U.S. PATENT DOCUMENTS

| | | |
|---|---|---|
| 5,517,366 A | 5/1996 | Togino |
| 2002/0039232 A1 | 4/2002 | Takeyama |
| 2009/0115842 A1 | 5/2009 | Saito et al. |
| 2010/0109980 A1 | 5/2010 | Tohara et al. |
| 2010/0290124 A1 | 11/2010 | Tohara et al. |

FOREIGN PATENT DOCUMENTS

| | | |
|---|---|---|
| EP | 1 429 171 A2 | 12/2003 |
| EP | 1 429 171 A2 | 6/2004 |
| EP | 2056153 A2 | 5/2009 |
| EP | 2 071 386 A2 | 6/2009 |
| JP | 08-327946 A | 12/1996 |
| JP | 2009-115906 A | 5/2009 |
| JP | 2010-266787 A | 11/2010 |

OTHER PUBLICATIONS

European Extended Search Report issued in European counterpart application No. EP12006138.7, dated Jun. 27, 2013.
European Partial Search Report issued in Counterpart European Patent Application No. 12006138.7 Jan. 17, 2013.

*Primary Examiner* — James Jones
(74) *Attorney, Agent, or Firm* — Rossi, Kimms & McDowell LLP

(57) ABSTRACT

An observation optical system is configured to introduce light fluxes from a plurality of display elements to an exit pupil via an optical element having a plurality of optical units, and to present a combined and enlarged image. Each display element is configured to display an original image. One optical unit of the observation optical system has a plurality of reflective surfaces. A reflective surface that has the highest refractive power among the plurality of reflective surfaces has a symmetrical plane. When a decentering section is defined as a section that contains the symmetrical plane, the plurality of optical units are arranged so that the decentering sections of the plurality of optical units are parallel to each other. The reflective surfaces having the highest refractive power in different optical units intersect each other.

14 Claims, 11 Drawing Sheets

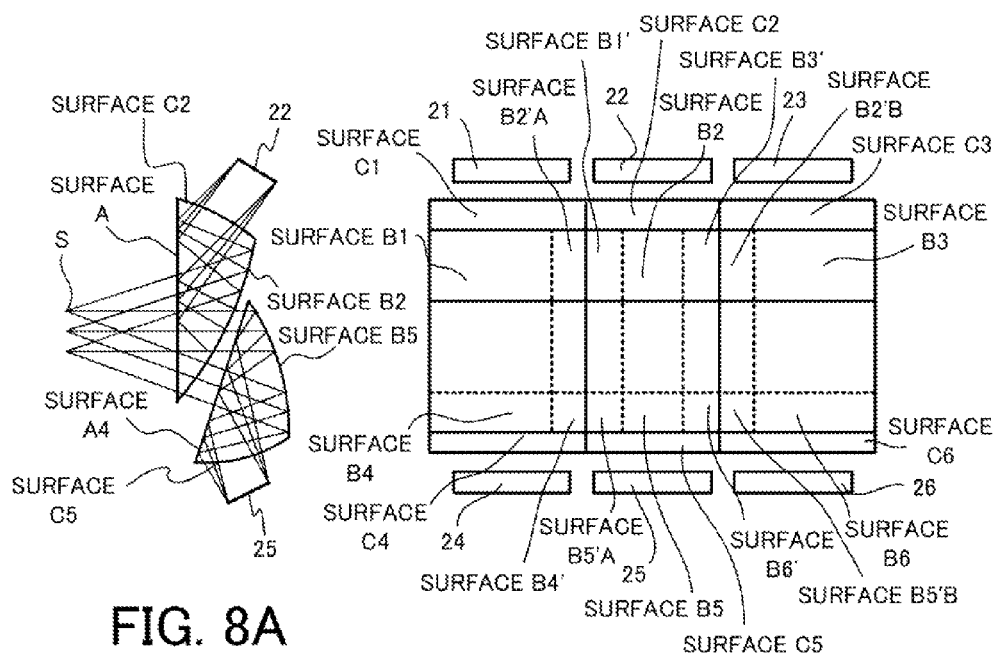
FIG. 8A
FIG. 8B
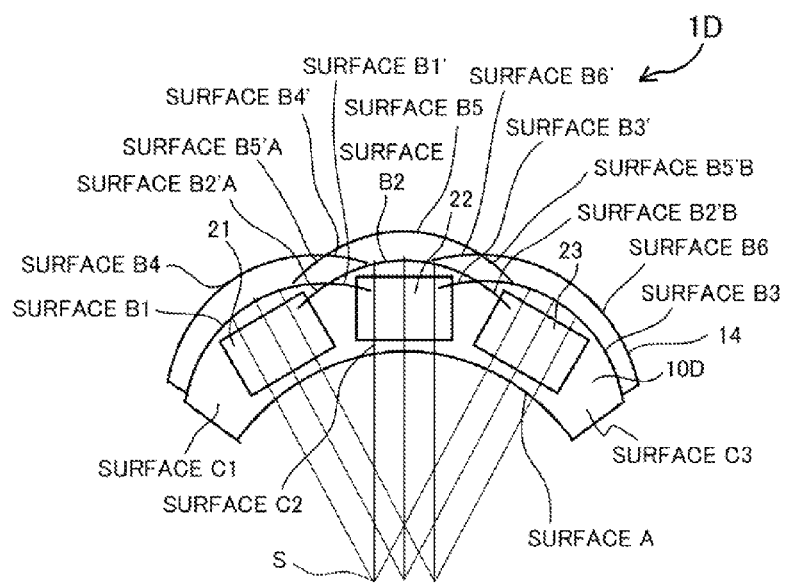
FIG. 8C

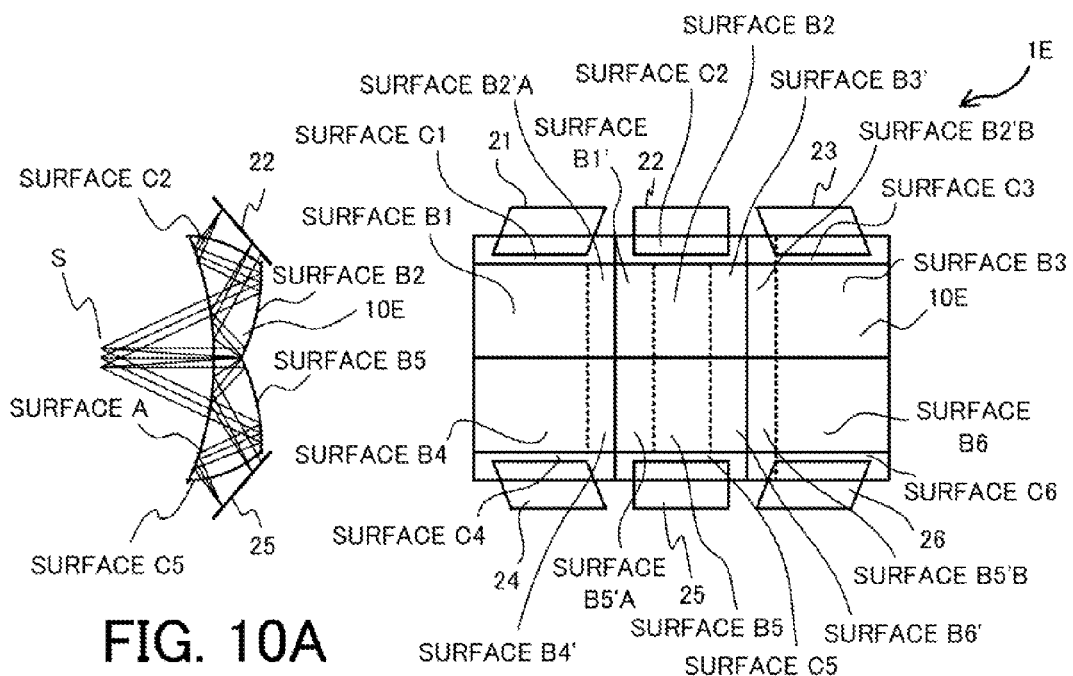
FIG. 10A
FIG. 10B
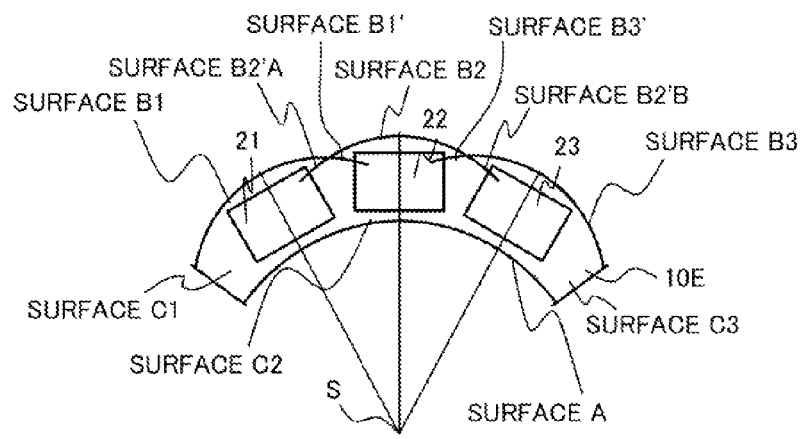
FIG. 10C

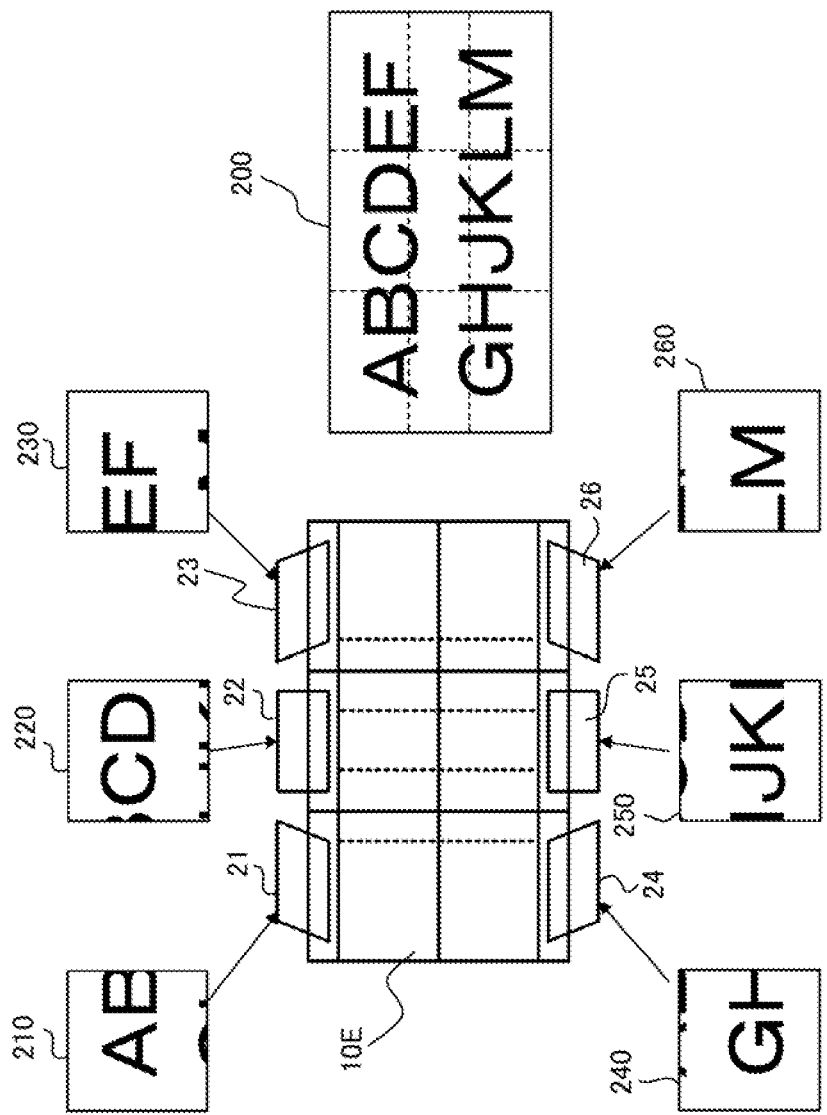

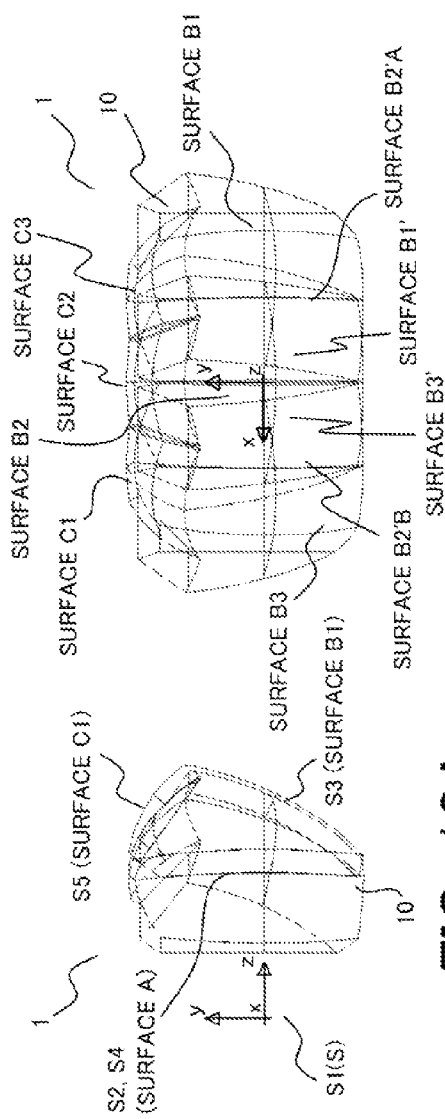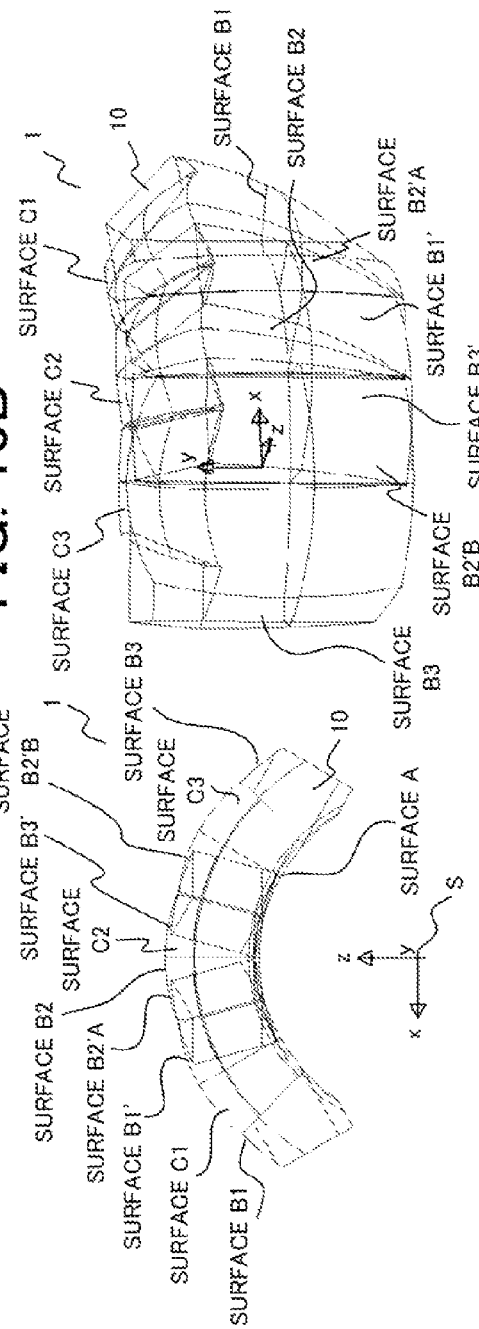

OBSERVATION OPTICAL SYSTEM AND IMAGE DISPLAY APPARATUS

BACKGROUND OF THE INVENTION

1. Field of the Invention

The present invention relates generally to an observation optical system configured to present one combined and enlarged image by combining light fluxes from a plurality of display elements, and more particularly to an observation optical system suitable for an image display apparatus, such as a head mounted display ("HMD").

2. Description of the Related Art

FIG. 13 of Japanese Patent Laid-Open No. ("JP") 2009-115906 discloses a structure for an observation optical system configured to lead an image at a wide field angle to an exit pupil (eyeball), and this observation optical system includes two jointed assemblies each including three display elements and three optical units so as to widen a field angle and to enable original images of six display elements to be observed as a combined and enlarged image. Assume that a visual axis is defined by a center field-angle principal ray from the exit pupil of the observation optical system to an optical element (the two assemblies), where the center field-angle principal ray passes the center of the exit pupil of the observation optical system and goes to the center of the combined and enlarged image. Each assembly is an optical system element of the optical unit configured to enable an original image displayed on one display element to be observed as an enlarged image, and includes optical planes having only one symmetrical plane. The optical units are arranged in one assembly so that the symmetrical surfaces of the optical elements accord with each other. Now assume that a decentering section of the observation optical system is defined as a section that includes the symmetrical plane. Then, in JP 2009-115906, the decentering sections of the assemblies intersect each other, and a line of the intersection accords with the axis perpendicular to the visual axis that passes the center of the exit pupil. These two assemblies are arranged in a radial direction around the axis perpendicular to the visual axis.

FIG. 11 of JP 2010-266787 discloses an observation optical system configured to lead light fluxes from two image display elements to the exit pupil utilizing two optical elements each of which has a plurality of reflective surfaces and folds an optical path. The observation optical system presents a combined and enlarged image of the original images displayed on the two image display elements. Each of the two optical elements has such optical surfaces that there is only one symmetrical plane, and these two optical elements are arranged so that their symmetrical planes accord with each other. One optical unit leads the light flux from one display element to the exit pupil along the optical path via an incident surface, a transmitting/reflecting surface, a reflective surface, and the transmitting/reflecting surface of the one optical unit. The other optical unit leads the light flux from the other display element to the exit pupil along an optical path via an incident surface, a transmitting/reflecting surface, a reflective surface, and the transmitting/reflecting surface of the other optical unit and part of the one optical unit. These two optical units enable the light fluxes from the point having the same field angle displayed on the two display elements to overlap each other. Thereby, even when the eyeball moves, the image is not shielded and is displayed by maximizing the resolutions of the two image display elements.

According to JP 2009-115906, the image is not chipped when the pupil of the observer is located near the center of the exit pupil. However, the image is chipped as the eyeball moves to the periphery of the exit pupil. In addition, according to JP 2010-266787, the observation optical system becomes thicker on the visible axis than each optical element when the (visual) axis is defined by the center field-angle principal ray from the exit pupil of the observation optical system to the optical element, where the center field-angle principal ray passes the center of the exit pupil of the observation optical system and goes to the center of the combined and enlarged image.

SUMMARY OF THE INVENTION

The present invention provides a small observation optical system and image display apparatus configured to present one image having a wide field angle by combining light fluxes from a plurality of display elements without causing an image to chip when an eyeball moves.

An observation optical system according to the present invention is configured to introduce light fluxes from a plurality of display elements to an exit pupil via an optical element having a plurality of optical units, and to present a combined and enlarged image. Each display element is configured to display an original image. One optical unit of the observation optical system has a plurality of reflective surfaces, and a reflective surface that has the highest refractive power among the plurality of reflective surfaces has a symmetrical plane. When a decentering section is defined as a section that contains the symmetrical plane, the plurality of optical units are arranged so that the decentering sections of the plurality of optical units are parallel to each other. The reflective surfaces each of which has the highest refractive power in different optical units intersect each other.

Further features of the present invention will become apparent from the following description of exemplary embodiments with reference to the attached drawings.

BRIEF DESCRIPTION OF THE DRAWINGS

FIGS. 8A, 8B, and 8C are sectional, front, and top views of an observation optical system according to a fourth embodiment.

FIGS. 10A, 10B, and 10C are sectional, front, and top views of an observation optical system according to a fifth embodiment.

FIG. 11 is a view for explaining original images and an observed image according to the fifth embodiment.

FIGS. 13A, 13B, 13C, and 13D are side, front, top, and perspective views of an observation optical system of a numerical example 2 according to the third embodiment.

DESCRIPTION OF THE EMBODIMENTS

Referring now to the accompanying drawings, a description will now be given of a variety of observation optical systems according to embodiments of the present invention. The observation optical system introduces light fluxes from a plurality of display elements each configured to display an original image, to an exit pupil via an optical element, and presents a combined and enlarged image. The observation optical system is suitable for an image display apparatus, such as an HMD.

Now there are defined a Z axis in which a direction from an eyeball of an observer to an observation optical system is positive, a Y axis orthogonal to the Z axis, in which an upward vertical direction is positive from the eyeball of the observer, and an X axis orthogonal to the Z axis in which a left horizontal direction is positive from the eyeball of the observer. An origin of the coordinate system that includes the XYZ axes is placed at the center position of the exit pupil of the observation optical system, and visual axis from the center of the exit pupil to the center of the combined and enlarged image is accorded with the Z axis. In addition, a decentering section of each optical unit in the observation optical system is defined as a section that contains the symmetrical plane of the reflective surface that has a key role in contributing to imaging among surfaces in each optical unit or that has the highest refractive power.

First Embodiment

Figure 1:
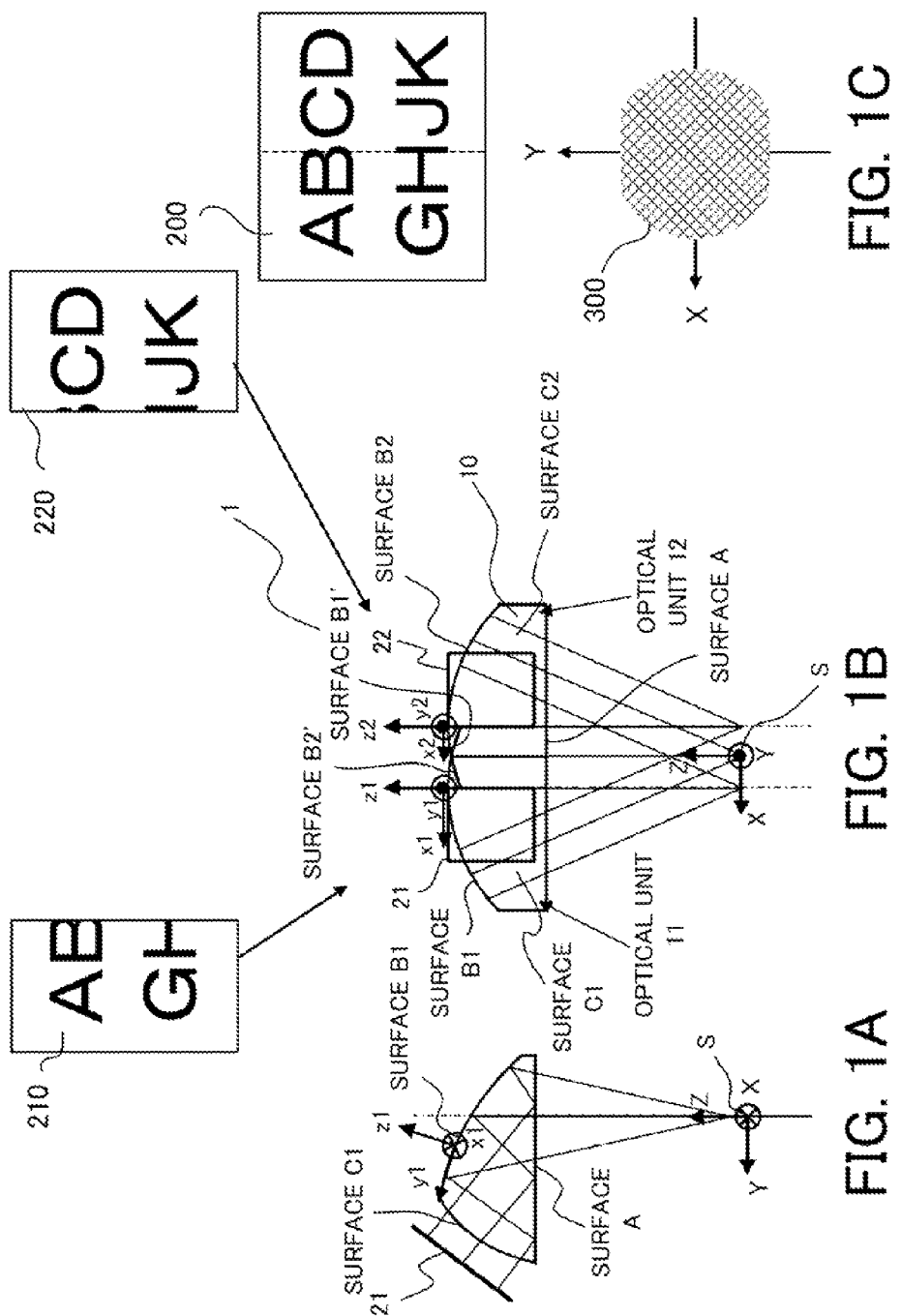
FIGS. 1A, 1B, and 1C are sectional and top views of an observation optical system according to a first embodiment.

FIG. 1A is a sectional view according to the first embodiment. FIG. 1B is its top view. FIG. 1C illustrates an overlap 300 between light fluxes from two original images having the same field angles on a pupil plane as the XY section.

As illustrated, reference numeral 1 denotes an observation optical system. Reference numeral 10 denotes an optical element (prism). Reference numeral 21 denotes a first display element configured to display an original image, and reference numeral 22 denotes a second display element configured to display an original image. "S" denotes a position of an exit pupil of the observation optical system. Reference numeral 210 denotes the original image displayed on the first display element 21, reference numeral 220 denotes the original image displayed on the second display element 22, and reference numeral 200 is an image observed via the observation optical system.

The optical element 10 includes surfaces A, B1, B2, C1, and C2 as outer surfaces, and surfaces B1' and B2' as inner surfaces. The surface A serves as a transmitting surface and a reflective surface. Each of the surfaces B1 and B2 serves as a reflective surface. Each of the surfaces C1 and C2 serves as a transmitting surface which the light flux enters from the corresponding display element. Each of the surfaces B1' and B2' serves as a transmitting surface and a reflective surface.

The surfaces A, B1, B1', and C1 constitute a first optical unit 11 configured to lead the light from the first display element 21 to the exit pupil S, and the surfaces A, B2, B2', and C2 constitute a second optical unit 12 configured to lead light from the second display element 22 to the exit pupil S. Thus, the optical element 10 includes a plurality of optical units.

Assume that the optical element 10 is made of a medium having a refractive index of n. The light flux (beam) from the first display element 21 enters the optical element 10 through the surface C1, and is reflected on the surface A by the internal total reflection because its incident angle upon the surface A is arcsin(1/n) or higher. Then, the light flux is reflected on the surfaces B1 and B1', enters the surface A at the angle of arcsin(1/n) or lower, and is led to the exit pupil S through the surface A.

The light flux (beam) from the second display element 22 enters the optical element 10 through the surface C2, and is reflected on the surface A by the internal total reflection because its incident angle upon the surface A is arcsin(1/n) or higher. Then, the light flux is reflected on the surfaces B2 and B2', enters the surface A at the angle of arcsin(1/n) or lower, and is led to the exit pupil S through the surface A.

The original images displayed on the first and second display elements 21 and 22 are observed as one combined image by the observer who places his eyeball at or near the exit pupil.

The light fluxes exiting from the points in the boundary area between the two original images overlap each other on the pupil plane due to the reflections on the surfaces B1 and B2 and the reflections on the half-mirror surfaces B1' and B2' on the front (pupil) sides of the surfaces B1 and B2. Thereby, when the eyeball moves or rotates in the effective pupil, the boundary between the two original images is not recognized by the eye of the observer, and one image can be observed without any chips.

The original images 210 and 220 do not contain substantially the same image, and the right end of the original image 210 and the left end of the original image 220 form the boundary between the two original images illustrated by the broken line on the observed image 200. One point on the broken line in the observed image 200 is composed of points having the same field angle in the image display apparatus according to this embodiment, and the light fluxes from the points having the same field angle of the original images 210 and 220 overlap each other at the pupil. When this overlap between the light fluxes on the pupil plane covers a pupil moving range caused by the rotations or movements of the eyeball, the complete image can be observed although the two original images do not contain substantially the same image portions. In other words, the image can be observed with an addition of the resolutions of the first and second display elements 21 and 22 configured to display the two original images, and the resolution can be effectively utilized.

The light flux emitted from the first display element 21 and reflected on the half-mirror surface B2' is non-effective light that does not reach the exit pupil S that is an effective point of the image observations, and the light flux emitted from the second display element 22 and reflected on the half-mirror surface B1' is non-effective light that does not reach the exit pupil S that is the effective point of the image observations.

The surfaces B1 and B1' constitute one continuous surface shape. The surfaces B2 and B2' also constitute one continuous surface shape. Each of the surfaces B1 and B2 is a decentering reflective surface. The surface B1 decenters from a y1z1 section as a symmetrical plane, and the surface B2 decenters from a y2z2 section as a symmetrical plane. In other words, the y1z1 and y2z2 sections are decentering sections of the decentering reflective surfaces B1 and B2.

In another view, the surfaces B1 and B1' (which may be simply referred to as "B1" hereinafter) and the surfaces B2 and B2' (which may be simply referred to as "B2" hereinafter) intersect each other on the YZ section. The surface B1 intersects the YZ section and is located mainly on the left side of the YZ section. The surface B1' is located on the right side of the YZ section. The surface B2 intersects the YZ section and is located mainly on the right side of the YZ section. The surface B2' is located on the left side of the YZ section.

The surfaces B1 and B2 intersect each other in the optical element 10, and the light fluxes from the points having the same field angles on the original images displayed on the display elements 21 and 22 overlap each other in the observation optical system and on the exit pupil plane. When the widths of the surfaces B1' and B2' are set so that this overlap between the light fluxes on the exit pupil can cover the pupil moving range caused by the rotations and movements of the eyeball, the complete image can be observed although the two original images do not substantially have the same image.

Each of the surfaces B1 and B2 is a reflective surface that plays a key role in contributing to imaging in the corresponding optical unit or that has the highest positive refractive power. Unnecessary decentering aberrations can be restrained when each of the surfaces B1 and B2 has only one symmetrical plane.

Both z1 and z2 axes are parallel to each other and form a predetermined angle relative to the visual axis. Both y1 and y2 axes are also parallel to each other. The y1z1 section and y2z2 sections that serve as decentering sections of the two optical units are parallel to each other.

Since the decentering sections of the optical unit do not intersect each other and are parallel to each other, the observation optical system can become thin. It is unnecessary that the y1 and y2 axes are parallel to each other, but the unparallel configuration may cause the image to distort or cause the image to be discontinuously observed. One solution for this problem is a correction by providing a non-display area of the original image in the effective display area of the display element, but the effective efficiency of the resolution lowers. Accordingly, the y1 and y2 axes may be arranged as parallel as possible.

The surface C1 is also plane-symmetrical with respect to the y1z1 section as the decentering section or the symmetrical plane. The surface C2 is also plane-symmetrical with respect to the y2z2 section as the decentering section or the symmetrical plane. Since a pair of the surface B1 and the surface C1 has the same section as the symmetrical plane and a pair of the surface B2 and the surface C2 has the same section as the symmetrical plane, unnecessary decentering aberrations can be restrained.

The surface A is plane-symmetrical with respect to the YZ section as a symmetrical plane. When the surface A may have a refractive power lower than that of each of the surfaces B1 and C1, a combined and enlarged image can be presented in which the original images displayed on the first and second display elements are smoothly connected.

When the surface A is a plane or a surface that has a curvature on the YZ section and no curvature on the XZ section, the surface A becomes a plane-symmetrical with respect to each of the YZ section, the y1z1 section, and the y2z2 section. In that case, all optical surfaces of each optical unit have the same surface as the symmetrical plane, and thus unnecessary decentering aberrations can be restrained.

Figure 2:
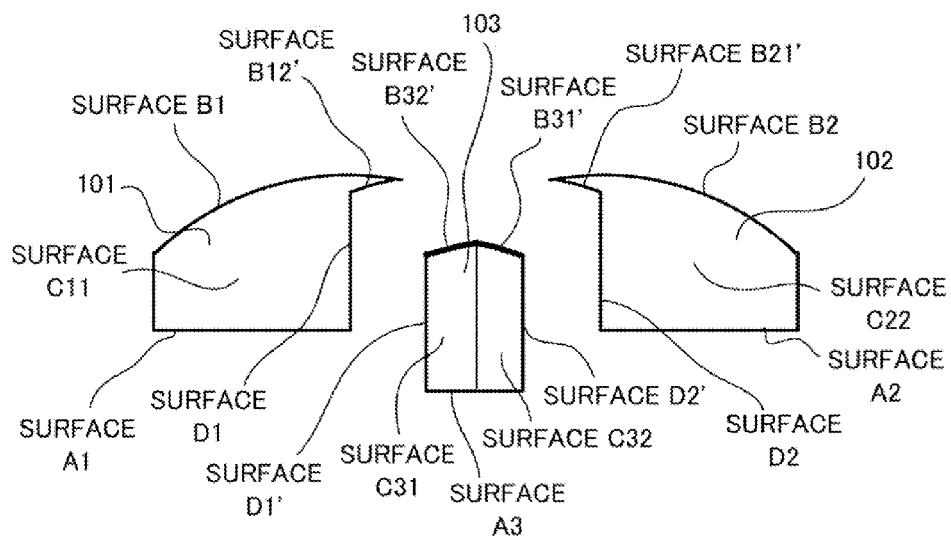
FIG. 2 is an exploded view of the optical element illustrated in FIGS. 1A and 1B according to the first embodiment.

FIG. 2 is a plane exploded view of the optical element 10. The optical element 10 is divided into a plurality of (three in this embodiment) elements, such as a first optical element (first element) 101, a second optical element 102, and a third optical element (second element) 103.

The first optical element 101 has five optical surfaces A1, B1, C11, B12', and D1 on a medium having a refractive index n>1. The second optical element 102 has five optical surfaces A2, B2, C22, B21', and D2 on the medium having the refractive index n>1.

The third optical element 103 has seven optical surfaces A3, B31', B32', C31, C32, D1', and D2' on the medium having the refractive index n>1. The surfaces B31' and B32' are provided inside of the surface B1 of the first optical element 101, and the surface B2 of the second optical element 102 (or inside of the optical element 10). None of the surfaces B31' and B32' expose to the outside of the optical element 10.

The optical element 10 of this embodiment has at least one such element, and at least one of the plurality of optical units has a surface made by the surfaces of the two elements. The optical element 10 has such an internal surface.

The first, second, and third optical elements 101, 102, and 103 are jointed as a result of that the surfaces B12' and B32' are jointed together, the surfaces B21' and B31' are jointed together, the D1 and D1' are jointed together, and the surfaces D2 and D2' are jointed together.

A coating that serves to transmit part of the light and reflect part of the light, such as a half-mirror, is formed on one of the surfaces B21' and B31' and one of the surfaces B12' and B32'. Each of the surfaces B1' and B2' has transmitting and reflective characteristics. The surfaces D1, D1', D2, and D2' are jointed as transmitting surfaces.

The surfaces A1, A2, and A3 constitute the surface A, the surfaces C11 and C31 constitute the surface C1, and the surfaces C22 and C32 constitute the surface C2.

Figure 3:
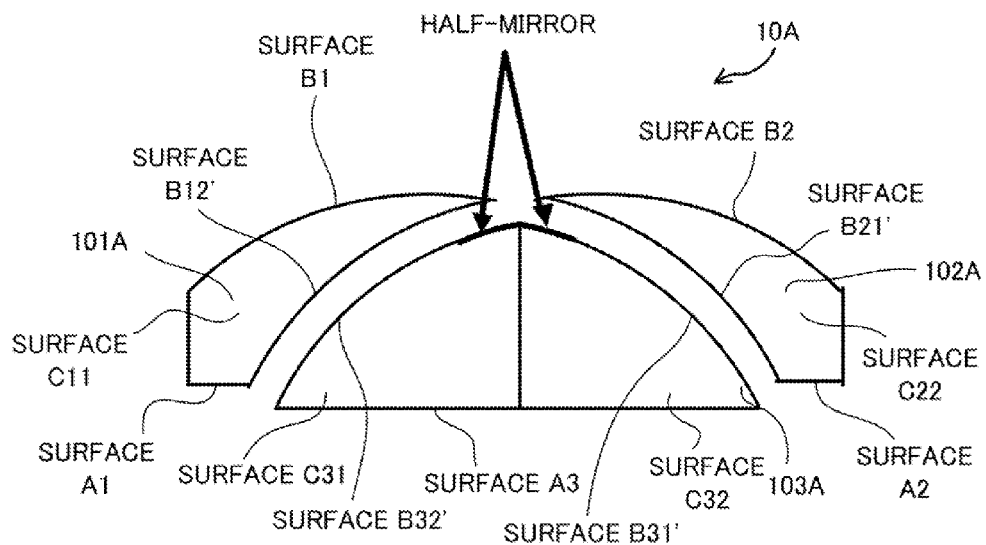
FIG. 3 is a top view of an optical element as a variation FIGS. 1A and 1B according to the first embodiment.

FIG. 3 is an exploded plane view of an optical element 10A applicable to the observation optical system 1 illustrated in FIGS. 1A and 1B instead of the optical element 10. The optical element 10A includes a first optical element (first element) 101A, a second optical element 102A, and a third optical element (second element) 103A.

The first optical element 101A has four optical surfaces A1, B1, C11 and B12' on the medium having the refractive index n>1. The second optical element 102A has four optical surfaces A2, B2, C22 and B21' on the medium having the refractive index n>1. The third optical element 103A has five optical surfaces A3, B31', B32', C31, and C32, on the medium having the refractive index n>1.

The first, second, and third optical elements 101A, 102A, and 103A are jointed as a result of that the surfaces B12' and B32' are jointed together, and the surfaces B21' and B31' are jointed together. A coating that serves to transmit part of the light and reflect part of the light, such as a half-mirror, is formed on one of the surfaces B21' and B31' and one of the surfaces B12' and B32'.

The surfaces A1, A3, B1, B1', C11, and C31 lead the light from the first display element 21 to the pupil and constitute the first optical unit. The surfaces A2, A3, B2, B1', C22, and C32 lead the light from the second display element 22 and constitute the second optical unit. The surfaces A1, A2, and A3 constitute the surface A, the surfaces C11 and C31 constitute the surface C1, and the surfaces C22 and C32 constitute the surface C2.

Figure 4:
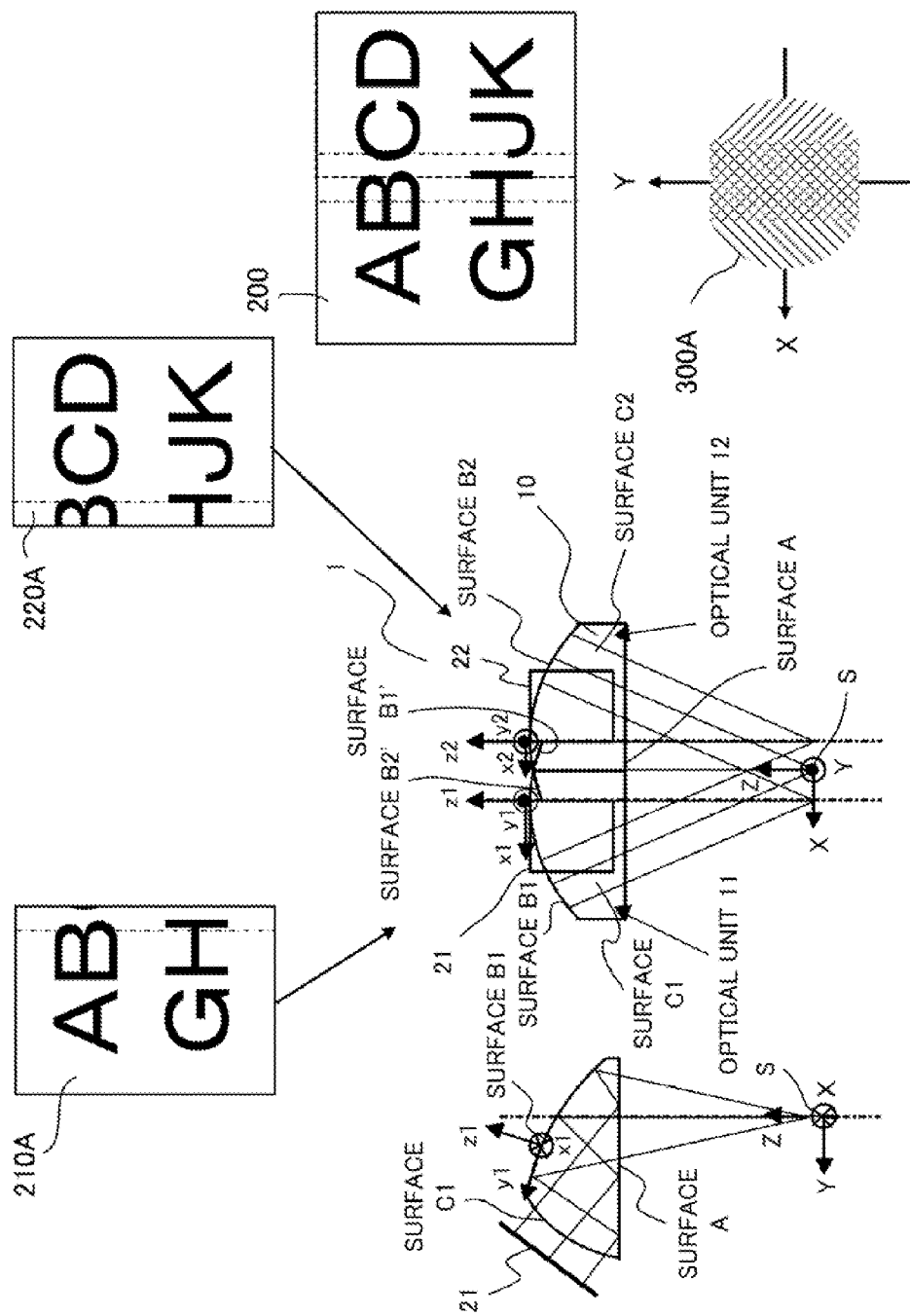
FIGS. 4A, 4B, and 4C are sectional and top views as a variation of FIGS. 1A, 1B, and 1C according to the first embodiment.

FIG. 4A is a sectional view of a variation of the first embodiment, and FIG. 4B is its top view. FIG. 4C illustrates an overlap 300A between light fluxes from two original images having the same field angles on the pupil plane as the XY section.

In FIGS. 4A, 4B, and 4C, the overlap on the pupil plane reduces and the original images partially duplicate. The same image is displayed on the right side of an alternate long and short dash line in the original image 210A, and on an left side of an alternate long and short dash line in the original image 220A. Different images are displayed in other areas.

In the overlap 300A which illustrates the statuses of the light fluxes from the points having the same field angles on the pupil plane, oblique lines going up from left to right represent the original image 210A, oblique lines going down from left to right represent the original image 220A, and a shaded portion represents the overlap between the light fluxes. This configuration can reduce an effective diameter of the half-mirror portion, scattering of the light quantity, and stray light.

As discussed, this embodiment arranges a plurality of decentering reflective surfaces each having at least one decentering sections so that the decentering sections are parallel to each other. The original image displayed on the display element 21 and the original image displayed on the display element 22 finally form one image to be observed, in which a field angle is different in the direction perpendicular to the decentering section.

A plurality of original images that contain different images in the direction perpendicular to the decentering section can be observed as one image by the observation optical system in which a plurality of optical units are arranged parallel to each other which have decentering reflective surfaces having at least one decentering section. Thereby, an observed field angle is wider than each display element configured to display the original image, and the optical system and the image display apparatus can be made thinner.

This embodiment provides the observation optical system and image display apparatus, which can combine the light fluxes from the plurality of display elements and present one image having a wide field angle without causing the observation optical system on the visual axis to be thicker than each optical unit in the optical system. In particular, according to this embodiment, each optical unit in the observation optical system in the visual axis direction is as thick as the observation optical system in the visual axis direction. Therefore, the observation optical system can be made very thin. In addition, the intersection between the surfaces B1 and B1' and the surfaces B2 and B2' can also make the observation optical system thinner than the non-intersection structure. Moreover, this embodiment provides the observation optical system and image display apparatus, which can effectively utilize the resolutions of the display elements without causing the image to chip even when the eyeball moves in combining the light fluxes from a plurality of display elements into one image having a wide field angle. The number of optical units may be increased in the optical system may so as to combine the light fluxes from three or more of display elements into one image having a wide field angle.

Second Embodiment

Figure 5:
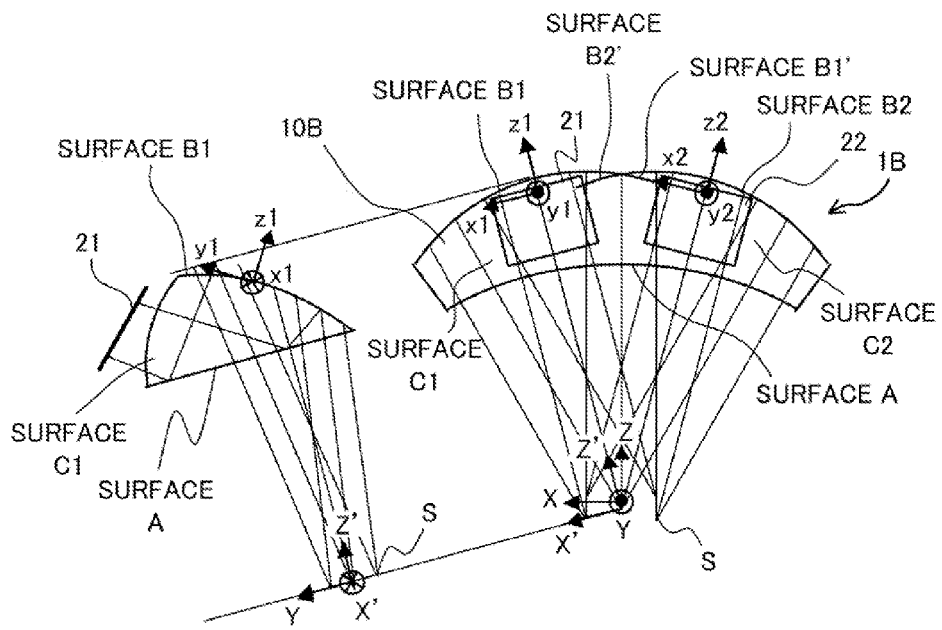
FIG. 5 illustrates sectional and top views of an observation optical system according to a second embodiment.

FIG. 5 illustrates a sectional view (left) and a top view (right) of an observation optical system 1B according to a second embodiment. Similar to the first embodiment, the optical element 10B includes surfaces A, B1, B2, C1, and C2 as outer surfaces, and surfaces B1' and B2' as inner surfaces. The surface A serves as a transmitting surface and a reflective surface. Each of the surfaces B1 and B2 serves as a reflective surface. Each of the surfaces C1 and C2 serves as a transmitting surface, and each of the surfaces B1' and B2' serves as a transmitting surface and a reflective surface.

In this embodiment, the y1z1 section and the y2z2 section have a rotational relationship around the Y axis where the origin is set to the center of the exit pupil S. The sectional view in FIG. 5 is taken along a section YZ' section that includes the center of the exit pupil S and the y1z1 section.

The surfaces A, B1, B1', and C1 constitute a first optical unit configured to lead light from the first display element 21 to the exit pupil S. The surfaces A, B2, B2', and C2 constitute a second optical unit configured to lead light from the second display element 22 to the exit pupil S.

The light from the first display element 21 and the light from the second display element 22 are led to the exit pupil S in a way similar to that of FIGS. 1A and 1B. According to the structure of this embodiment, similar to FIGS. 1A and 1B, when the eyeball moves or rotates in the effective pupil, the boundary between the two original images is not recognized by the eye of the observer, and one image can be observed without any chips.

The surfaces B1 and B1' constitute one continuous surface shape. The surfaces B2 and B2' also constitute one continuous surface shape. The surface B1 decenters from the y1z1 section, and the surface B2 decenters from the y2z2 section. The y1z1 section is a section on which a principal ray that connects the center of the exit pupil with the center of the original image displayed on the first display element bends when it is reflected on the surface B1, and the surface B1 is plane-symmetrical with respect to the y1z1 section.

Each of the surfaces B1 and B2 is a reflective surface that plays a key role in contributing to imaging in the optical unit or that has the highest positive refractive power. Unnecessary decentering aberrations can be restrained when each of the surfaces B1 and B2 has only one symmetrical plane.

The surfaces B1 and B2 intersect each other on the YZ section. The surface B1 intersects the YZ section and is located mainly on the left side of the YZ section. The surface B1' is located on the right side of the YZ section. The surface B2 intersects the YZ section and is located mainly on the right side of the YZ section. The surface B2' is located on the left side of the YZ section.

The surfaces B1 and B2 intersect each other in the optical element 10, and the light fluxes from the points having the same field angles on the original images of the display elements 21 and 22 overlap each other in the observation optical system and on the exit pupil plane. When the widths of the surfaces B1' and B2' are set so that this overlap between the light fluxes on the exit pupil can cover the pupil moving range caused by the rotations and movements of the eyeball, the complete image can be observed although the two original images do not substantially have the same image.

The surface C1 is also plane-symmetrical with respect to the y1z1 section as the symmetrical plane. The surface C2 is also plane-symmetrical with respect to the y2z2 section as the symmetrical plane. The surface A is plane-symmetrical with respect to the YZ section as a symmetrical plane.

The decentering sections of the two optical units interest each other. The line of intersection accords with the Y axis but does not accord with a line made by connecting the center of the exit pupil S and an arbitrary point in the observed image. This configuration can make thin the observation optical system.

It is unnecessary that the line of intersection between the decentering sections of the two optical units completely accords with the Y axis, but an angle between the line of intersection and the Y axis causes the image to distort or to be discontinuously observed. One solution for this problem is a correction by providing a non-display area of the original image in the effective display area of the display element, but the effective efficiency of the resolution lowers.

Accordingly, the line of intersection between the decentering sections of the two optical units and the Y axis are arranged as parallel as possible. When they form an angle, the line of intersection may not accord with the line that connects the center of the exit pupil S to the arbitrary point in the observed image.

The observation optical system 1B can apply a division structure similar to that of the optical element illustrated in FIGS. 2 and 3.

Third Embodiment

Figures 6A, 6B:
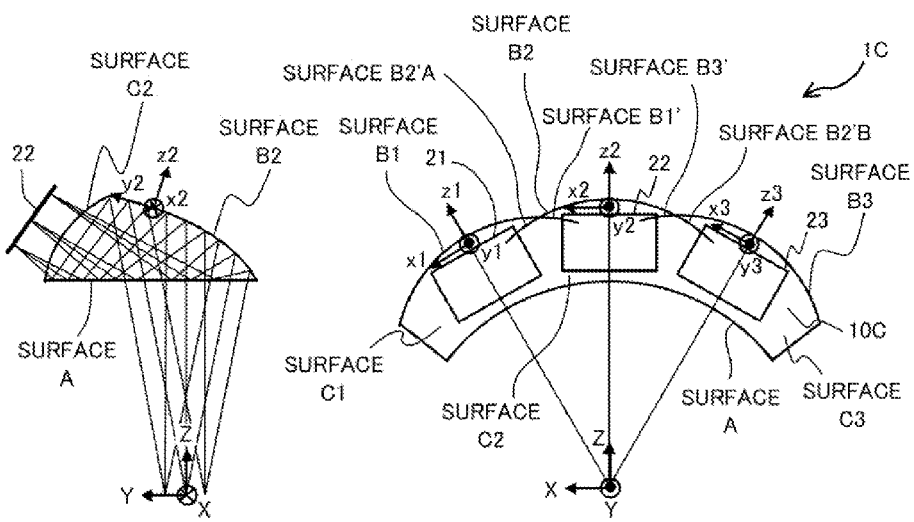
FIGS. 6A and 6B are sectional and top views of an observation optical system according to a third embodiment.
Figure 7:
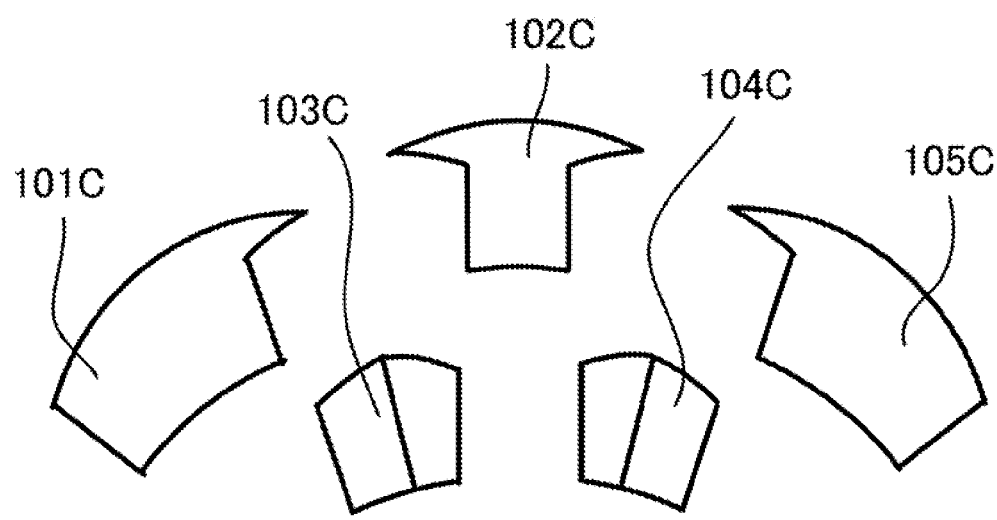
FIG. 7 is an exploded view of the optical element illustrated in FIGS. 6A and 6B according to the third embodiment.

FIG. 6A is a sectional view of an observation optical system 1C according to a third embodiment. FIG. 6B is its top view. FIG. 7 is an exploded plane view of the optical element 10C.

The optical element 10C includes surfaces A, B1, B2, B3, C1, C2, and C3 as outer surfaces, and surfaces B1' and B2'A, B2'B, B3' as inner surfaces. The surface A serves as a transmitting surface and a reflective surface. Each of the surfaces B1, B2, and B3 serves as a reflective surface. Each of the surfaces C1, C2, and C3 serves as a transmitting surface. Each of the surfaces B1', B2'A, B2'B, and B3' serves as a transmitting surface and a reflective surface.

The surfaces A, B1, B1', and C1 constitute a first optical unit configured to lead light from the first display element 21 to the exit pupil S. The surfaces A, B2, B2'A, B2'B, and C2 constitute a second optical unit configured to lead light from the second display element 22 to the exit pupil S. The surfaces A, B3, B3', and C3 constitute a third optical unit configured to lead light from the third display element 23 to the exit pupil S.

The light flux from the first display element 21 enters the optical element 10C through the surface C1, and is reflected on the surface A by the internal total reflection because its incident angle upon the surface A is arcsin(1/n) or higher. Then, the light flux is reflected on the surfaces B1 and B1', enters the surface A at the angle of arcsin(1/n) or lower, and is led to the exit pupil S through the surface A.

The light flux from the second display element 22 enters the optical element 10C through the surface C2, and is reflected on the surface A by the internal total reflection because its incident angle upon the surface A is arcsin(1/n) or higher. Then, the light flux is reflected on the surfaces B2, B2'A and B2'B, enters the surface A at the angle of arcsin(1/n) or lower, and is led to the exit pupil S through the surface A.

The light flux from the third display element 23 enters the optical element 10C through the surface C3, and is reflected on the surface A by the internal total reflection because its incident angle upon the surface A is arcsin(1/n) or higher. Then, the light flux is reflected on the surfaces B3 and B3', enters the surface A at the angle of arcsin(1/n) or lower, and is led to the exit pupil S through the surface A.

The original images displayed on the first, second, and third display elements 21, 22, and 23 are observed as one combined image by the observer who places his eyeball at or near the exit pupil.

The light fluxes exiting from the points in the boundary areas among the three original images overlap each other on the pupil plane due to the reflections on the surfaces B1, B2, and B3, and the reflections on the half-mirror surfaces B1', B2'A, B2'B, and B3' on the front (pupil) sides of the surfaces B1, B2, and B3. Thereby, when the eyeball moves or rotates in the effective pupil, the boundaries among the three original images are not recognized by the eye of the observer, and one image can be observed without any chips.

The surfaces B1 and B1' constitute one continuous surface shape. The surfaces B2, B2'A and B2'B also constitute one continuous surface shape. The surfaces B3 and B3' constitute one continuous surface shape. The surface B1 decenters from the y1z1 section, the surface B2 decenters from the y2z2 section, and the surface B3 decenters from the y3z3 section. The surface B1 is plane-symmetrical with respect to the y1z1 section as the symmetrical plane. The surface B2 is plane-symmetrical with respect to the y2z2 section as the symmetrical plane. The surface B3 is plane-symmetrical with respect to the y3z3 section as the symmetrical plane. Each of the surfaces B1, B2, and B3 is a reflective surface that plays a key role in contributing to imaging in the optical unit or that has the highest positive refractive power. Unnecessary decentering aberrations can be restrained when each of the surfaces B1, B2, and B3 has only one symmetrical plane.

The surfaces B1 and B2 intersect each other in the optical element 10C, and the surfaces B2 and B3 intersect each other in the optical element 10C. Since the surfaces B1 and B2 intersect each other in the optical element 10C, the light fluxes from the points having the same field angle on the original images of the display elements 21 and 22 overlap each other in the observation optical system and on the exit pupil plane. Similarly, since the surfaces B2 and B3 intersect each other in the optical element 10C, the light fluxes from the points having the same field angle on the original images of the display elements 21 and 22 overlap each other in the observation optical system and on the exit pupil plane. When the widths of the surfaces B1', B2'A, B2'B, and B3' are set so that this overlap between the light fluxes on the exit pupil can cover the pupil moving range caused by the rotations and movements of the eyeball, the image can be observed with no chips although two of the three original images do not substantially have the same images.

The surface C1 is also plane-symmetrical with respect to the y1z1 section as the symmetrical plane.

The surface A is symmetrical with respect to the y1z1 section so that the y1z1 section becomes a section on which a principal ray that connects the center of the exit pupil with the center of the original image displayed on the first display element 21 bends when it is reflected on the surface B1. Similarly, the surface A is symmetrical with respect to each of the y2z2 section and the y3z3 section.

Due to this structure, the first to third optical units are substantially similarly shaped, and applicable to observations of one image derived from the original images displayed on three display elements or more. In addition, since surfaces of the optical units have common decentering surfaces as symmetrical planes, the aberration becomes symmetrical and unnecessary decentering aberrations can be restrained or easily corrected.

FIG. 7 is an exploded plane view illustrating an example to which the structure illustrated in FIG. 2 is applied. The optical element 10C of this embodiment includes five elements 101C to 105C. The division structure illustrated in FIG. 3 is applicable to this embodiment.

Fourth Embodiment

Figure 9:
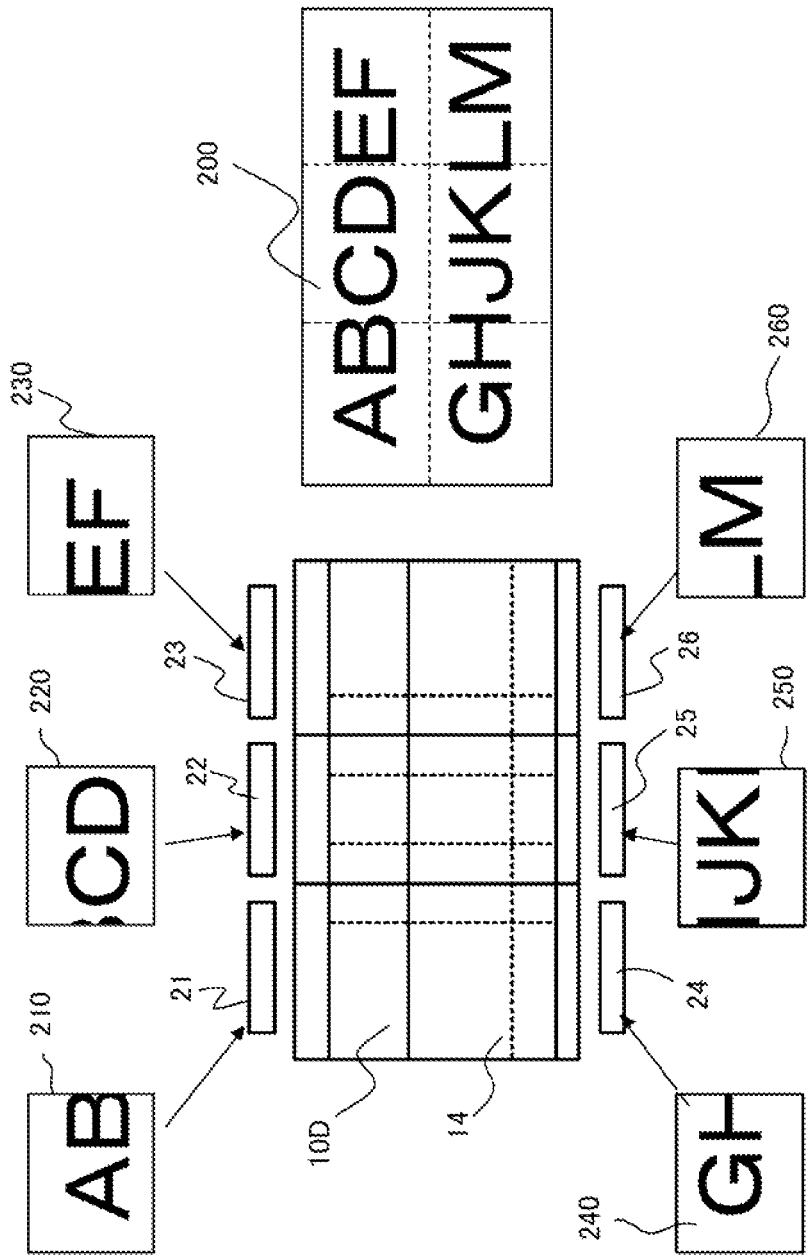
FIG. 9 is a view for explaining original images and an observed image according to the fourth embodiment.
Figures 12A, 12B:
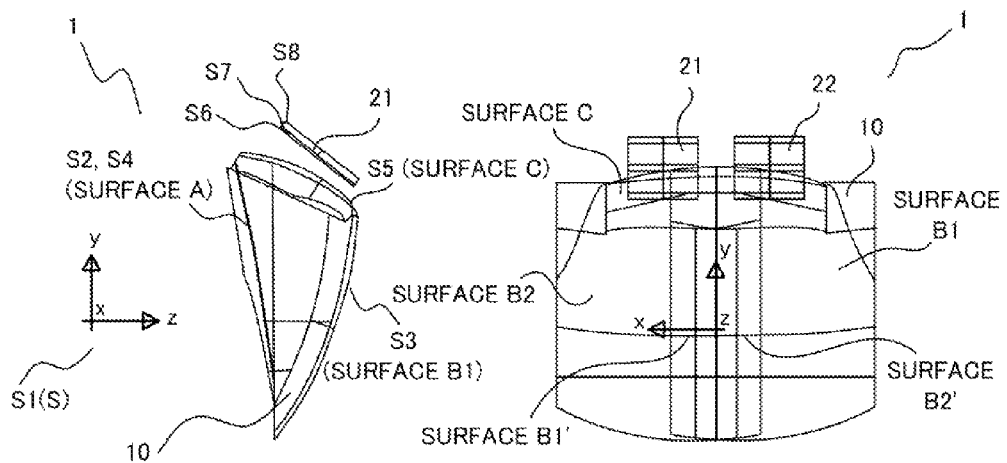
FIGS. 12A, 12B, 12C, and 12D are side, front, top, and perspective views of an observation optical system of a numerical example 1 according to the first embodiment.
Figures 12C, 12D:
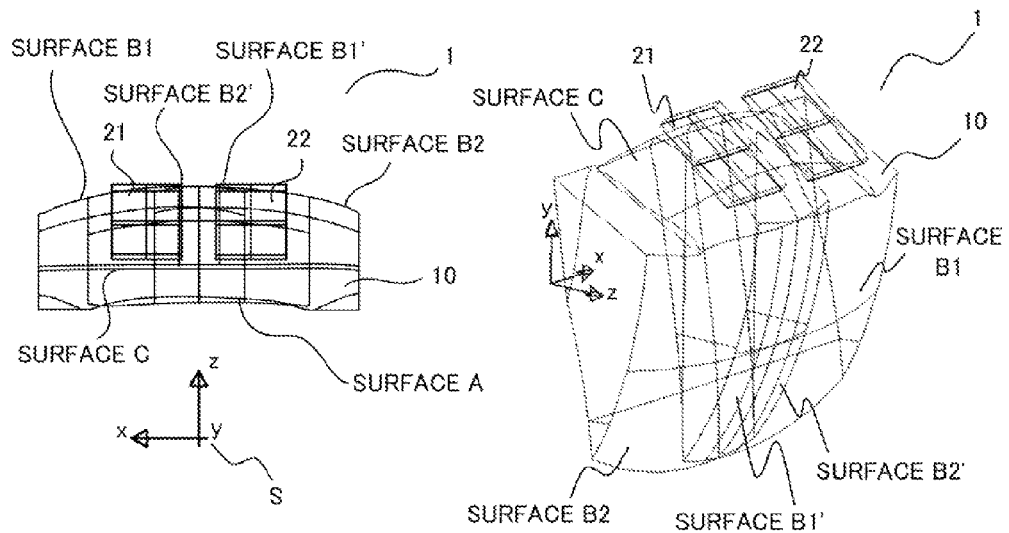

FIGS. 8A, 8B, and 8C are sectional, front, and top views of an observation optical system 1D according to a fourth embodiment. FIG. 9 is a view for explaining original images 210 to 260 and an observed image 200 according to the fourth embodiment. This embodiment is similar to two observation optical systems 1C according to the third embodiment which are arranged upside down.

The optical element 10D includes surfaces A, B1, B2, B3, C1, C2, and C3 as outer surfaces, and surfaces B1' and B2'A, B2'B, B3' as inner surfaces. The surface A serves as a transmitting surface and a reflective surface. Each of the surfaces B1, B2, and B3 serves as a transmitting surface and a reflective surface. Each of the surfaces C1, C2, and C3 serves as a transmitting surface. Each of the surfaces B1', B2'A, B2'B, and B3' serves as a transmitting surface and a reflective surface.

The optical element 14 includes surfaces A4, B4, B5, B6, C4, C5, and C6 as outer surfaces, and surfaces B4' and B5'A, B5'B, B6' as inner surfaces. The surface A4 serves as a transmitting surface and a reflective surface. Each of the surfaces B4, B5, and B6 serves as a reflective surface. Each of the surfaces C4, C5, and C6 serves as a transmitting surface. Each of the surfaces B4', B5'A, B5'B, and B6' serves as a transmitting surface and a reflective surface.

The surfaces A, B1, B1', and C1 constitute a first optical unit configured to lead light from the first display element 21 to the exit pupil S. The surfaces A, B2, B2'A, B2'B, and C2 constitute a second optical unit configured to lead light from the second display element 22 to the exit pupil S. The surfaces A, B3, B3', and C3 constitute the third optical unit configured to lead light from the third display element 23 to the exit pupil S.

The surfaces A4, B4, B4', C4, and part of the surfaces B1, B1' and A constitute a fourth optical unit configured to lead light from the fourth display element 24 to the exit pupil S. The surfaces A4, B5, B5'A, B5'B, and C5 and part of the surfaces B2, B2'A, B2'B, and A constitute a fifth optical unit configured to lead light from the fifth display element 25 to the exit pupil S. The surfaces A4, B6, B6', and C6 and part of the surfaces B3, B3', and A constitute a sixth optical unit configured to lead light from the sixth display element 26 to the exit pupil S.

The light flux from the first display element 21 enters the optical element 10D through the surface C1, and is reflected on the surface A by the internal total reflection because its incident angle upon the surface A is arcsin(1/n) or higher. Then, the light flux is reflected on the surfaces B1 and B1', enters the surface A at the angle of arcsin(1/n) or lower, and is led to the exit pupil S through the surface A.

The light flux from the second display element 22 enters the optical element 10D through the surface C2, and is reflected on the surface A by the internal total reflection because its incident angle upon the surface A is arcsin(1/n) or higher. Then, the light flux is reflected on the surfaces B2, B2'A and B2'B, enters the surface A at the angle of arcsin(1/n) or lower, and is led to the exit pupil S through the surface A.

The light flux from the third display element 23 enters the optical element 10D through the surface C3, and is reflected on the surface A by the internal total reflection because its incident angle upon the surface A is arcsin(1/n) or higher. Then, the light flux is reflected on the surfaces B3 and B3', enters the surface A at the angle of arcsin(1/n) or lower, and is led to the exit pupil S through the surface A.

The light flux from the fourth display element 24 enters the optical element 14 through the surface C4, and is reflected on the surface A4 by the internal total reflection because its incident angle upon the surface A4 is arcsin(1/n) or higher. Then, the light flux is reflected on the surfaces B4 and B4', enters the surface A4 at the angle of arcsin(1/n) or lower, and exits from the optical element 14. The light exited from the optical element 14 enters the optical element 10 through the surfaces B1 and B1', exits from the optical element 10 through the surface A, and is led to the exit pupil S.

The light flux from the fifth display element 25 enters the optical element 14 through the surface C5, and is reflected on the surface A4 by the internal total reflection because its incident angle upon the surface A4 is arcsin(1/n) or higher. Then, the light flux is reflected on the surfaces B5, B5'A and B5'B, enters the surface A4 at the angle of arcsin(1/n) or lower, and exits from the optical element 14. The light exited from the optical element 14 enters the optical element 10 through the surfaces B2, B2'A and B2'B, exits from the optical element 10 through the surface A, and is led to the exit pupil S.

A light flux from the sixth display element 26 enters the optical element 14 through the surface C6, and is reflected on the surface A4 by the internal total reflection because its incident angle upon the surface A4 is arcsin(1/n) or higher. Then, the light flux is reflected on the surfaces B6 and B6', enters the surface A4 at the angle of arcsin(1/n) or lower, and exits from the optical element 14. The light exited from the optical element 14 enters the optical element 10 through the surfaces B3 and B3', exits from the optical element 10 through the surface A, and is led to the exit pupil S.

The original images displayed on the first, second, and third display elements 21 to 23 are observed as one combined image by the observer who places his eyeball at or near the exit pupil.

The light fluxes exiting from the points in the boundary areas among the three upper original images overlap each other on the pupil plane due to the reflections on the surfaces B1, B2, and B3, and the reflections on the half-mirror surfaces B1', B2'A, B2'B, and B3' on the front (pupil) sides of the surfaces B1, B2, and B3.

The light fluxes exiting from the points in the boundary areas among the three lower original images overlap each other on the pupil plane due to the reflections on the surfaces B4, B5, and B6, and the reflections on the half-mirror surfaces B4', B5'A, B5'B, and B6' on the front (pupil) sides of the surfaces B4, B5, and B6.

About the light fluxes exiting from the points in the boundary areas among a pair of upper and lower original images, for example, the light fluxes reflected by the surfaces B4 and B4' transmit through the surfaces B1 and B1', and the light fluxes from the other display element are reflected on the surfaces B1 and B1', and these light fluxes overlap each other on the pupil plane.

This embodiment may be understood as if the first and fourth optical units, the second and fifth optical units, . . . are arranged as in the third embodiment. The first and fourth optical units, the second and fifth optical units, . . . are arranged so that their decentering sections are shared and the light fluxes from the points having the same field angles in the original images overlap on the pupil.

Thereby, when the eyeball moves or rotates in the effective pupil, the boundaries among the six original images are not recognized by the eye of the observer, and one image can be observed without any chips.

Since the light fluxes from the boundary between neighboring original images overlap on the pupil in this embodiment, one image can be observed although each original image does not contain the same image. Therefore, a high-resolution image can be observed by maximizing the pixels used to display the original images.

Fifth Embodiment

FIGS. 10A to 10C are sectional, front, and top views of the observation optical system 1E according to the fifth embodiment. FIG. 11 is a view for explaining original images 210 to 260 and an observed image 200 according to the fifth embodiment. The fifth embodiment corresponds to two observation optical systems according to the third embodiment which are arranged upside down.

The optical element 10E includes surfaces A, B1, B2, B3, C1, C2, C3, B4, B5, B6, C4, C5, and C6 as outer surfaces, and surfaces B1', B2'A, B2'B, B3', B4', B5'A4, B5'B, and B6' as inner surfaces.

The surface A serves as a transmitting surface and a reflective surface. Each of the surfaces B1 to B6 serves as a reflective surface. Each of the surfaces C1 to C6 serves as a transmitting surface. Each of the surfaces B1', B2'A, B2'B, B3', B4', B5'A, B5'B, and B6' serves as a transmitting surface and a reflective surface.

The surfaces A, B1, B1', and C1 constitute a first optical unit configured to lead light from the first display element 21 to the exit pupil S. The surfaces A, B2, B2'A, B2'B, and C2 constitute a second optical unit configured to lead light from the second display element 22 to the exit pupil S. The surfaces A, B3, B3', and C3 constitute a third optical unit configured to lead light from the third display element 23 to the exit pupil S.

The surfaces A4, B4, B4', and C4 constitute a fourth optical unit configured to lead light from the fourth display element 24 to the exit pupil S. The surfaces A4, B5, B5'A, B5'B, and C5 constitute a fifth optical unit configured to lead light from the fifth display element 25 to the exit pupil S. The surfaces A4, B6, B6', and C6 constitute a sixth optical unit configured to lead light from the sixth display element 26 to the exit pupil S.

The light fluxes from the first, second, and third display elements 21, 22, and 23 are led to the exit pupil S similarly to the fourth embodiment.

The light flux from the fourth display element 24 enters the optical element 10E through the surface C4, and is reflected on the surface A by the internal total reflection because its incident angle upon the surface A is arcsin(1/n) or higher. Then, the light flux is reflected on the surfaces B4 and B4', enters the surface A4 at the angle of arcsin(1/n) or lower, exits from the optical element 10E, and is led to the exit pupil S.

The light flux from the fifth display element 25 enters the optical element 10E through the surface C5, and is reflected on the surface A by the internal total reflection because its incident angle upon the surface A is arcsin(1/n) or higher. Then, the light flux is reflected on the surfaces B5, B5'A and B5'B, enters the surface A at the angle of arcsin(1/n) or lower, exits from the optical element 10E, and is led to the exit pupil S.

The light flux from the sixth display element 26 enters the optical element 10E through the surface C6, and is reflected on the surface A by the internal total reflection because its incident angle upon the surface A is arcsin(1/n) or higher. Then, the light flux is reflected on the surfaces B6 and B6', enters the surface A at the angle of arcsin(1/n) or lower, and exits from the optical element 10E, and is led to the exit pupil S.

The original images displayed on the first, second, and third display elements 21 to 23 are observed as one combined image by the observer who places his eyeball at or near the exit pupil.

The light fluxes exiting from the points in the boundary areas among the three upper original images overlap each other on the pupil plane due to the reflections on the surfaces B1, B2, and B3, and the reflections on the half-mirror surfaces B1', B2'A, B2'B, and B3' on the front (pupil) sides of the surfaces B1, B2, and B3.

The light fluxes exiting from the points in the boundary areas among the three lower original images overlap one another on the pupil plane due to the reflections on the surfaces B4, B5, and B6, and the reflections on the half-mirror surfaces B4', B5'A, B5'B, and B6' on the front (pupil) sides of the surfaces B4, B5, and B6.

A pair of upper and lower original images partially display the same image. The light fluxes emitted from the same points in the original images do not overlap on the pupil, but complementally form the pupil, preventing the image from chipping due to the rotations of the eyeball and the shift of the pupil.

Thereby, when the eyeball moves or rotates in the effective pupil, the boundaries among the six original images are not recognized by the eye of the observer, and one image can be observed without any chips.

According to this embodiment, the light fluxes from the boundary between neighboring original images in the horizontal direction overlap on the pupil, and thus the image can be observed without chips although each original image does not contain the same image. Although the same image is displayed in the perpendicular direction and thus the resolution lowers, the image can be observed with high resolutions because pixels used to display the original image are fully used in the horizontal direction. Since the upper and lower optical units are symmetrical, the structure becomes advantageously simple.

A description will now be given of numerical examples according to the above embodiments.

Tables 1 and 2 indicate coordinates of the vertexes of each surface in a global coordinate system in which a Z axis is set to an axis from the exit pupil as the origin to the center of the observed image, a Y axis is set to an axis perpendicular to the Z axis and parallel to the decentering section that is a symmetrical plane of the decentering reflective surface, and an X axis is set so as to form a right-hand system with the above two axes. Tables 1 and 2 also indicate data of a radius of curvature, a type of a surface, a refractive index, and an Abbe number.

In each table, X, Y, and Z denote X, Y, and Z coordinate values at each surface vertex. "A" denotes a rotation around the X axis expressed with a degree as the unit where the counterclockwise direction is set to the positive direction. "R" denotes a radius of curvature. Nd and vd denote a refractive index and Abbe number for the d-line of a material subsequent to the target surface.

"TYP" denotes a type of a surface shape. "SPH" denotes a spherical surface. "AAS" denotes an anamorphic surface. "FFS" denotes a rotationally asymmetrical surface expressed by the following expression. A number subsequent to "FFS" denotes an aspheric coefficient expressed in the column of a corresponding number under the table. A value of the coefficient is 0 when the aspheric coefficient is not designated.

$$z = (1/R)*(x^2+y^2)/\left(1+\left(1-(1+k)*(1/R)^2*(x^2+y^2)\right)^{(1/2)}\right) + \quad (1)$$

$$c2 + c4*y + c5*(x^2 - y^2) + c6*(-1 + 2*x^2 + 2*y^2) +$$

$$c10*(-2*y + 3*x^2*y + 3*y^3) +$$

$$c11*(3*x^2*y - y^3) + c12*(x^4 - 6*x^2*y^2 + y^4) +$$

$$c13*(-3*x^2 + 4*x^4 + 3*y^2 - 4*y^4) +$$

$$c14*(1 - 6*x^2 + 6*x^4 - 6*y^2 + 12*x^2*y^2 + 6*y^4) + c20*$$

$$(3*y - 12*x^2*y + 10*x^4*y - 12*y^3 + 20*x^2*y^3 + 10*y^5) +$$

$$c21*(-12*x^2*y + 15*x^4*y + 4*y^3 + 10*x^2*y^3 - 5*y^5) +$$

$$c22*(5*x^4*y - 10*x^2*y^3 + y^5) +$$

$$c23*(x^6 - 15*x^4*y^2 + 15*x^2*y^4 - y^6) +$$

$$c24*(-5*x^4 + 6*x^6 + 30*x^2*y^2 - 30*x^4*y^2 - 5*y^4 -$$

$$30*x^2*y^4 + 6*y^6) + c25*(6*x^2 - 20*x^4 + 15*x^6*y^2 +$$

$$15*x^4*y^2 + 20*y^4 - 15*x^2*y^4 - 15*y^6) +$$

$$c26*(-1 + 12*x^2 - 30*x^4 + 20*x^6 + 12*y^2 - 60*x^2*y^2 +$$

$$60*x^4*y^2 - 30*y^4 + 60*x^2*y^4 + 20*y^6) + \cdots$$

Numerical Example 1

FIG. 12A to 12D are side, front, top, and perspective views of an observation optical system according to a numerical example 1. Table 1 indicates its data. The numerical example 1 is structurally similar to the first embodiment but is different from the first embodiment in that the surfaces C1 and C2 are not separated and one surface C is defined.

Table 1 indicates data corresponding to the first optical unit. The surface S1 corresponds to the exit pupil S. The surfaces S2 and S4 correspond to the surface A. The surface S3 corresponds to the surface B1 and B1'. The surface S5 corresponds to the surface C. The surface S6 and subsequent surfaces are substituted for the cover glass, etc. of the display element. The surface S8 is an original image display plane of the display element.

The light flux from the first display element 21 is led to the surface A through the surface C, and is reflected on the surface A by the internal total reflection because its incident angle upon the surface A is arcsin(1/n) or higher. Then, the light flux is reflected on the surfaces B1 and B1', enters the surface A at the angle of arcsin(1/n) or lower, and is led to the exit pupil S through the surface A.

In Table 1, data of the second optical unit corresponds to a value of X of the surface S3 subtracted by 3. The decentering sections, such as the y1z1 and y2z2 sections, shift in the X-axis direction in the global coordinate system by ±3 mm.

The light flux from the second display element 22 is led to the surface A through the surface C, and is reflected on the surface A by the internal total reflection because its incident angle upon the surface A is arcsin(1/n) or higher. Then, the light flux is reflected on the surfaces B2 and B2', enters the surface A at the angle of arcsin(1/n) or lower, and is led to the exit pupil S through the surface A.

As illustrated in FIGS. 12A to 12D, the surfaces B1' and B2' that are semitransparent reflective surfaces are located on the pupil side of the surfaces B2 and B1 so as to enable the light fluxes from the boundary areas to overlap on the pupil. Thereby, when the eyeball moves or rotates in the effective pupil, the boundary between the two original images is not recognized by the eye of the observer, and one image can be observed without any chips.

Numerical Example 2

FIG. 13A to 13D are side, front, top, and perspective views of an observation optical system according to a numerical example 2. Table 2 indicates its data. The numerical example 2 is structurally similar to the third embodiment.

Table 2 indicates data corresponding to the second optical unit of the numerical example 2. The surface S1 corresponds to the exit pupil S, and the surfaces S2 and S4 correspond to the surface A, and the surface S3 corresponds to the surface B2 and B2'. The surface S5 corresponds to the surface C2. The surface S6 and subsequent surfaces are substituted for the cover glass, etc. of the display element. The surface S8 is an original image display plane of the display element.

The light flux from the second display element 22 is led to the surface A through the surface C2, and is reflected on the surface A by the internal total reflection because its incident angle upon the surface A is arcsin(1/n) or higher. Then, the light flux is reflected on the surfaces B2 and B2', enters the surface A at the angle of arcsin(1/n) or lower, and is led to the exit pupil S through the surface A.

The data of the second optical unit is made when the origin position of the data of Table 2 is rotated around the Y axis by 30° relative to the global coordinate. The data of the first optical unit is made when the origin position of the data of Table 2 is rotated around the Y axis by −30° relative to the global coordinate.

The decentering sections, such as the y1z1, y2z2, and y3z3 sections, are arranged at rotated positions around the origin of the global coordinate system. Similarly, in this system, the decentering sections as symmetrical planes of the surfaces C1, C2, and C3 are arranged at rotated positions around the origin of the global coordinate system.

A light flux from the first display element 21 is led to the surface A through the surface C1, and is reflected on the surface A by the internal total reflection because its incident angle upon the surface A is arcsin(1/n) or higher. Then, the

TABLE 1

| SURF | X | Y | Z | A | R | typ | Nd | vd |
|---|---|---|---|---|---|---|---|---|
| 1 | 0 | 0 | 0 | 0 | ∞ | SPH | 1 | 0 |
| 2 | 0 | −6.916 | 24.873 | 5.041 | −195.5828 | FFS1 | 1.5709 | 33.8 |
| 3 | 3 | −0.976 | 33.509 | −18.531 | −60.6587 | FFS2 | −1.5709 | 33.8 |
| 4 | 0 | −6.916 | 24.873 | 5.041 | −195.5828 | FFS1 | 1.5709 | 33.8 |
| 5 | 0 | 19.793 | 31.66 | 57.15 | −30.7246 | FFS3 | 1 | 0 |
| 6 | 0 | 21.366 | 32.843 | 51.396 | ∞ | SPH | 1.6 | 50 |
| 7 | 0 | 21.534 | 32.977 | 51.396 | ∞ | SPH | 1.45 | 50 |
| 8 | 0 | 21.964 | 33.32 | 51.396 | ∞ | SPH | 1 | 0 |

| FFS1 | | | | | | |
|---|---|---|---|---|---|---|
| c1 | 2.95E+01 | c5 | 2.00E−03 | c6 | −2.68E−04 |
| c10 | 8.22E−06 | c11 | −3.19E−05 | c12 | 2.02E−07 |
| c13 | −1.01E−07 | c14 | 3.03E−07 | c20 | −1.67E−09 |
| c21 | −1.34E−08 | c22 | 1.82E−08 | c23 | 5.71E−10 |
| c24 | −2.45E−10 | c25 | 4.08E−11 | c26 | −4.46E−11 |

| FFS2 | | | | | | |
|---|---|---|---|---|---|---|
| c1 | 2.55E−01 | c5 | −4.03E−04 | c6 | −4.98E−05 |
| c10 | 1.11E−05 | c11 | −2.67E−05 | c12 | −5.76E−07 |
| c13 | 6.22E−07 | c14 | −2.01E−07 | c20 | −1.22E−09 |
| c21 | −2.45E−09 | c22 | −1.25E−08 | c23 | −1.12E−10 |
| c24 | 2.58E−11 | c25 | −1.98E−10 | c26 | 4.57E−11 |

| FFS3 | | | | | | |
|---|---|---|---|---|---|---|
| c1 | −1.81E+00 | c5 | 2.62E−03 | c6 | −3.08E−03 |
| c10 | 7.20E−05 | c11 | −8.67E−04 | c12 | −3.90E−05 |
| c13 | 1.48E−05 | c14 | 2.58E−06 | c20 | 5.35E−08 |
| c21 | 6.55E−07 | c22 | −1.22E−06 | c23 | −5.05E−08 |
| c24 | 3.42E−08 | c25 | −1.03E−08 | c26 | −2.36E−09 | light flux is reflected on the surfaces B1 and B1', is incident upon the surface A at the angle of arcsin(1/n) or lower, transmits the surface A, and is led to the exit pupil S.

The light flux from the third display element 23 is led to the surface A through the surface C3, and is reflected on the surface A by the internal total reflection because its incident angle upon the surface A is arcsin(1/n) or higher. Then, the light flux is reflected on the surfaces B3 and B3', enters the surface A at the angle of arcsin(1/n) or lower, and is led to the exit pupil S through the surface A.

As illustrated in FIGS. 13A to 13D, the surfaces B1', B2'A, B2'B, and B3' are semitransparent reflective surfaces and are located on the pupil side of the surfaces B2, B1, and B3. Thereby, the light fluxes from the boundary area can overlap each other on the pupil.

Thereby, when the eyeball moves or rotates in the effective pupil, the boundaries between the three original images are not recognized by the eye of the observer, and one image can be observed without any chips.

In this example, the surface A has an anamorphic surface shape around the global center, and is rotationally symmetrical around the Y axis. In addition, the surface A is plane-symmetrical with respect to the decentering section as a symmetrical plane of another optical surface. Thus, this example may be configured by radially arranging substantially the same optical units around the Y axis (or origin) so that the light fluxes from the boundary areas between the original images can overlap each other on the pupil. Two optical units or four optical units or more may be used to provide the effects of the present invention.

This embodiment sets the exit pupil S to the global origin, and radially arranges the optical units around the Y axis. However, the present invention is not limited to this embodiment. The distance LA from the surface A to the global origin may be equally arranged from the Y axis so as to satisfy the following expression:

$$15 \text{ mm} < LA < 50 \text{ mm} \quad (2)$$

When a value exceeds the lower limit, the eye relief becomes so short that the face and eyelashes interferes with the apparatus and a sense of installation lowers. When the value exceeds the upper limit, the observation optical system and entire apparatus become large.

mm in the horizontal direction. The display element 2 has an image display size of about 0.81 inches (11.4 mm×17.2 mm), and displays an image of a horizontal field angle of 50° (overlap area in an angular range of 24°) and a vertical field angle of 38° at infinity in the positive direction of the Z axis. Since this embodiment displays and divides the horizontal field angle utilizing the two display elements, the horizontal angle of the display element 2 corresponds to 37° from +25° to −12°. The vertical field angle of 38° remains since it is not divided.

The data of the optical unit 5 of this embodiment corresponds to the data in Table 1 in which codes of B values for the surfaces S3 and S5 are turned into negative.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-186788, filed Aug. 30, 2011 which is hereby incorporated by reference herein in its entirety.

What is claimed is:

1. An observation optical system configured to introduce light fluxes from a plurality of display elements to an exit pupil via an optical element having a plurality of optical units, and to present a combined and enlarged image, each display element being configured to display an original image,
    wherein each of optical units of the observation optical system has a plurality of reflective surfaces, and a reflective surface that has the highest refractive power among the plurality of reflective surfaces has a symmetrical plane, and when a decentering section is defined as a section that contains the symmetrical plane, the plurality of optical units are arranged so that the decentering sections of the plurality of optical units are parallel to each other, the reflective surfaces each of which has the highest refractive power in two adjacent optical units intersecting each other so that each reflective surface having the highest refractive power projects from the reflective surface having the highest reflective power of a counterpart to a side of the exit pupil of the counterpart.

TABLE 2

| SURF | X | Y | Z | A | R | typ | Nd | vd |
|------|---|---|---|---|---|-----|-----|-----|
| 1 | 0 | 0 | 0 | 0 | ∞ | SPH | 1 | 0 |
| 2 | 0 | 0 | 30 | 0 | −148.2864 | AAS | 1.5709 | 33.8 |
| 3 | 0 | −2.024 | 39.759 | −25.39 | −47.7315 | FFS1 | −1.5709 | 33.8 |
| 4 | 0 | 0 | 30 | 0 | −148.2864 | AAS | 1.5709 | 33.8 |
| 5 | 0 | 19.832 | 39.548 | 54.024 | −30.5453 | FFS2 | 1 | 0 |
| 6 | 0 | 22.26 | 41.31 | 59.039 | ∞ | SPH | 1.6 | 50 |
| 7 | 0 | 22.444 | 41.42 | 59.039 | ∞ | SPH | 1.45 | 50 |
| 8 | 0 | 22.916 | 41.703 | 59.039 | ∞ | SPH | 1 | 0 |

| FFS1 | | | | | |
|------|---|---|---|---|---|
| c1 | 2.41E−01 | c5 | −2.50E−03 | c6 | −1.70E−04 |
| c10 | 9.32E−06 | c11 | 1.25E−05 | c12 | 5.01E−08 |
| c13 | −1.33E−07 | c14 | −3.58E−09 | | |

| FFS2 | | | | | |
|------|---|---|---|---|---|
| c1 | 1.51E+00 | c5 | −7.92E−04 | c6 | −3.85E−03 |
| c10 | 1.42E−04 | c11 | 1.02E−04 | c12 | −9.19E−06 |
| c13 | 1.44E−06 | c14 | 3.13E−06 | | |

This embodiment has an elliptical exit pupil with a minor axis of 9.6 mm in the vertical direction and a major axis of 12

2. The observation optical system according to claim 1, wherein the optical element is divided into a plurality of elements, and one of the plurality of elements has an inner surface that serves as a transmitting surface and a reflective surface and is arranged inside of the optical element, and wherein at least one of the plurality of optical units has the inner surface.

3. The observation optical system according to claim 2, wherein the plurality of elements includes:

a first element having an outer surface that exposes to outside of the optical element on a side of the inner surface, and serves as a reflective surface that reflects the light flux toward the exit pupil; and a second element having the inner surface, and wherein the outer surface and the inner surface constitute one continuous surface shape.

4. The observation optical system according to claim 1, wherein each optical unit has a transmitting surface which the light flux from a corresponding one of the display elements enters, and the transmitting surface is plane-symmetrical with respect to a corresponding decentering section.

5. The observation optical system according to claim 1, wherein a plurality of original images have no areas used to display the same image, and an overlap between the light fluxes from the display elements corresponding to the same field angle in the combined and enlarged image on the exit pupil covers an effective pupil.

6. The observation optical system according to claim 1, wherein a plurality of original images have areas used to display the same image, and an overlap between the light fluxes from the display elements corresponding to the same field angle in the combined and enlarged image on the exit pupil is part of an effective pupil.

7. An image display apparatus comprising an observation optical system according to claim 1.

8. An observation optical system configured to introduce light fluxes from a plurality of display elements to an exit pupil via an optical element having a plurality of optical units, and to present a combined and enlarged image, each display element being configured to display an original image, wherein each of optical units of the observation optical system has a plurality of reflective surfaces, and a reflective surface that has the highest refractive power among the plurality of reflective surfaces has a symmetrical plane, and when a decentering section is defined as a section that contains the symmetrical plane, the plurality of optical units are arranged so that the decentering sections of the plurality of optical units intersect each other along an axis perpendicular to an axis that is made by connecting a center of the exit pupil to a center of the combined and enlarged image, the reflective surfaces each of which has the highest refractive power in different optical units intersecting each other so that each reflective surface having the highest refractive power projects from the reflective surface having the highest reflective power of a counterpart to a side of the exit pupil of the counterpart.

9. The observation optical system according to claim 8, wherein the optical element is divided into a plurality of elements, and one of the plurality of elements has an inner surface that serves as a transmitting surface and a reflective surface and is arranged inside of the optical element, and wherein at least one of the plurality of optical units has the inner surface.

10. The observation optical system according to claim 9, wherein the plurality of elements includes:

a first element having an outer surface that exposes to outside of the optical element on a side of the inner surface, and serves as a reflective surface that reflects the light flux toward the exit pupil; and a second element having the inner surface, and wherein the outer surface and the inner surface constitute one continuous surface shape.

11. The observation optical system according to claim 8, wherein each optical unit has a transmitting surface which the light flux from a corresponding one of the display elements enters, and the transmitting surface is plane-symmetrical with respect to a corresponding decentering section.

12. The observation optical system according to claim 8, wherein a plurality of original images have no areas used to display the same image, and an overlap between the light fluxes from the display elements corresponding to the same field angle in the combined and enlarged image on the exit pupil covers an effective pupil.

13. The observation optical system according to claim 8, wherein a plurality of original images have areas used to display the same image, and an overlap between the light fluxes from the display elements corresponding to the same field angle in the combined and enlarged image on the exit pupil is part of an effective pupil.

14. An image display apparatus comprising an observation optical system according to claim 8.

* * * * *